United States Patent
Hautson et al.

(10) Patent No.: US 9,529,455 B2
(45) Date of Patent: Dec. 27, 2016

(54) METHOD OF DETECTING POINT OF CONTACT BETWEEN A TIP OF A UTENSIL AND WRITING SUPPORT

(71) Applicant: Commissariat à l'énergie atomique et aux énergies alternatives, Paris (FR)

(72) Inventors: Tristan Hautson, Grenoble (FR); Saifeddine Aloui, Grenoble (FR); David Dominique, Claix (FR); Timothée Jobert, Grenoble (FR); Andréa Vassilev, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/389,077

(22) PCT Filed: Mar. 28, 2013

(86) PCT No.: PCT/EP2013/056810
§ 371 (c)(1),
(2) Date: Sep. 29, 2014

(87) PCT Pub. No.: WO2013/144338
PCT Pub. Date: Oct. 3, 2013

(65) Prior Publication Data
US 2015/0062095 A1 Mar. 5, 2015

(30) Foreign Application Priority Data

Mar. 29, 2012 (FR) ...................................... 12 52880

(51) Int. Cl.
*G06F 3/0354* (2013.01)
*G06F 3/041* (2006.01)
*G06F 3/046* (2006.01)

(52) U.S. Cl.
CPC .......... *G06F 3/03545* (2013.01); *G06F 3/046* (2013.01); *G06F 3/0418* (2013.01)

(58) Field of Classification Search
None
See application file for complete search history.

(56) References Cited

U.S. PATENT DOCUMENTS

| 6,263,230 B1 | 7/2001 | Haynor et al. |
| 2002/0171427 A1 | 11/2002 | Wiegert et al. |
| (Continued) | | |

FOREIGN PATENT DOCUMENTS

| FR | 2 952 450 | 5/2011 |
| WO | 02/43045 | 5/2002 |
| WO | 2005/020057 | 3/2005 |

*Primary Examiner* — Joseph Haley
*Assistant Examiner* — Emily Frank
(74) *Attorney, Agent, or Firm* — Occhiuti & Rohlicek LLP

(57) ABSTRACT

A method of detecting a point of contact between a tip of an instrument and a writing support, the instrument being one of a pen and an eraser, and the method comprising determining, with the aid of a magnetic object fixed without any degree of freedom on the instrument, the height of a point of the instrument with respect to a bearing face of a tablet. The bearing face constituting the writing support or supporting the writing support. The method further includes: comparing the height determined with a preconfigured contact threshold, and detecting a point of contact between the tip of the instrument and the writing support if the height determined is less than the contact threshold and, in the converse case, detecting no point of contact between the tip of the instrument and the writing support.

11 Claims, 4 Drawing Sheets

(56) References Cited

U.S. PATENT DOCUMENTS

| | | | |
|---|---|---|---|
| 2007/0085836 A1* | 4/2007 | Ely | G06F 3/03545 345/173 |
| 2008/0106520 A1 | 5/2008 | Free et al. | |
| 2010/0110021 A1* | 5/2010 | Chiu | G06F 3/046 345/173 |
| 2013/0009907 A1* | 1/2013 | Rosenberg | G06F 3/046 345/174 |

* cited by examiner

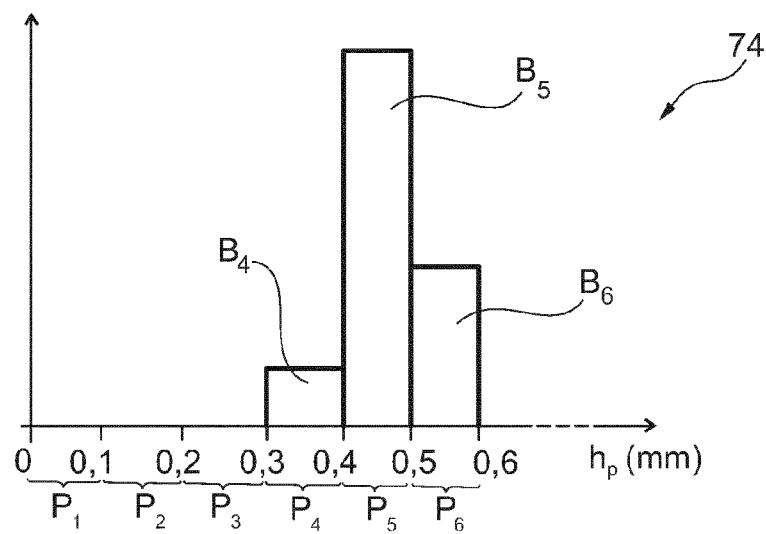
Fig. 5
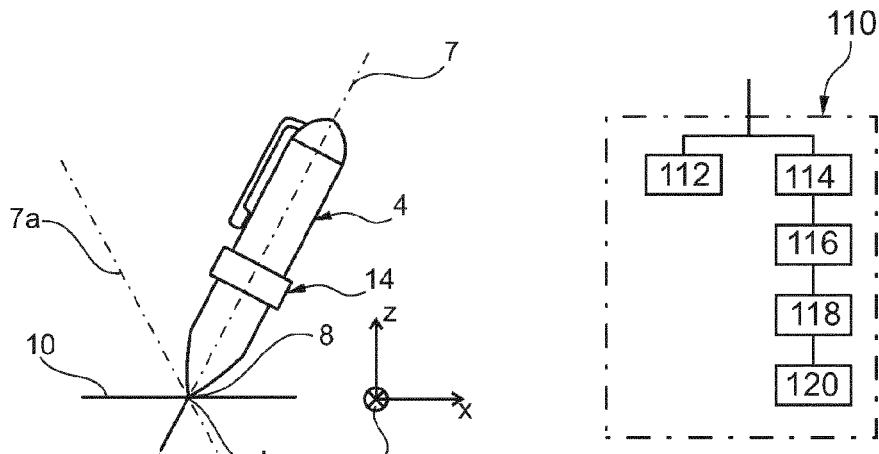
Fig. 7
Fig. 6
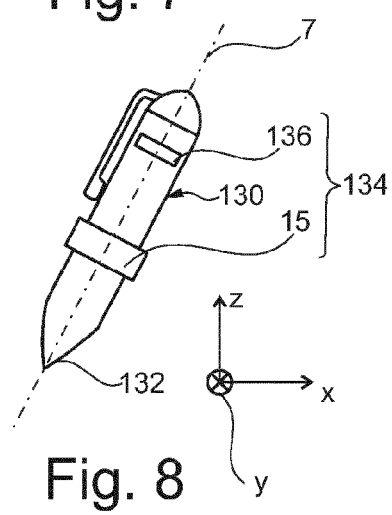
Fig. 8

METHOD OF DETECTING POINT OF CONTACT BETWEEN A TIP OF A UTENSIL AND WRITING SUPPORT

RELATED APPLICATIONS

This application is a U.S. National Stage of international application number PCT/EP2013/056810 filed Mar. 28, 2013, which claims the benefit of the priority date of French Patent Application FR 1252880, filed Mar. 29, 2012, the contents of which are herein incorporated by reference.

FIELD OF INVENTION

The invention relates to a method and an apparatus for detecting a point of contact between a tip of an instrument and a writing support. The subject of the invention is also a method of logging the trace drawn by a tip of an instrument on a writing support.

BACKGROUND

The instrument is chosen in the group composed of a pen and of an eraser.

By pen is here meant any instrument that can be manipulated directly by the hand of a human being so as to draw on a physical writing support a trace. Typically, the trace is visible to the naked eye either directly on the physical support or on a display screen. To leave a trace which is directly visible on the support, the pen deposits a colored liquid or solid to form the trace directly visible by a human being on the writing support. The colored liquid is typically an ink or paint. The colored solid is for example graphite.

By eraser is here meant any instrument that can be manipulated directly by the hand of a human being so as to draw on a physical writing support a trace which, when it encounters a trace left by the pen, erases the trace left by this pen. The erasure can be a digital erasure of data of a trace recorded with the aid of a pen or be a physical erasure of the trace on the support. For example, the physical erasure of the trace on the support can stem from a chemical reaction and/or from a mechanical effect such as abrasion. In contradistinction to the pen, the trace drawn by the eraser is generally not visible to the naked eye.

Here, "drawing" encompasses the fact of traversing the writing support with a tip so as to write or erase.

The writing support is a sheet of paper, a cloth or any other support on which it is possible to draw.

To correctly log the trace drawn by this tip on a writing support, it is very important to correctly detect the existence of the point of contact between the tip of the instrument and the writing support. Indeed, each time that the tip is no longer in contact with the writing support, the logged trace must be interrupted.

Known methods for logging the trace drawn by a tip of an instrument on a writing support, comprise:
1. —the measurement of the position and of the orientation of a magnetic object fixed without any degree of freedom on the instrument,
2. —the computation of the position of the tip as a function of the measured position and of the measured orientation of the magnetic object,
3. —the detection of a point of contact between the tip of the instrument and the writing support,
4. —each time that a point of contact is detected, the recording of the computed position for the tip, the successive recording of these computed positions forming the log of the trace drawn by the tip of the instrument on the writing support.

For example, such a method is disclosed in patent application WO 02/043045. In this patent application, the detection of the point of contact is carried out by measuring the pressure which is exerted on the tip. Indeed, the pressure which is exerted on the tip of a pen is much larger when the tip is bearing on the writing support that when it is in the air. Accordingly, the tip is mounted slidingly displaceable inside the pen and the pen comprises a transducer capable of converting the displacement of the tip into a signal indicating the existence of a point of contact.

Thus, the necessity of detecting the point of contact between the tip of the pen and the writing support is manifested by the addition of a displacement transducer inside the pen, thereby complicating the production thereof.

Prior art is also known from FR2952450A1 and US2008/106520A1.

SUMMARY OF INVENTION

The invention is aimed at detecting the point of contact between the tip of an instrument, such as a pen or an eraser, and the writing support without resorting to a tip displacement transducer. Its subject is therefore such a method of detection in accordance with claim 1.

The method hereinabove makes it possible to avoid the use inside the instrument of a transducer capable of converting the mechanical pressure which is exerted on the tip of the instrument when writing is in progress into a signal indicating the existence of a point of contact. This method therefore allows simpler production of the instrument.

The embodiments of this method of detection can comprise one or more of the characteristics of the dependent claims.

These embodiments furthermore exhibit the following advantages:
  the use of the height of the tip of the instrument with respect to the bearing face renders the method more robust in relation to changes of user;
  the taking into account of the reliability of the measurement of the height in the choice of the value of the contact threshold increases the accuracy of the detection of a point of contact;
  the automatic computation of the value of the contact threshold as a function of the first maximum in the probability density of the height makes it possible to automatically adapt the value of this contact threshold to the thickness of the writing support;
  the automatic calibration of the position of the magnetic object with respect to the tip makes it possible to automatically adapt to an arbitrary position of the magnetic object along the axis of the instrument.

The subject of the invention is also a method of logging the trace drawn by a tip of an instrument on a writing support in accordance with claim 9.

The use of the same magnetic object to determine the position of the tip and to detect the point of contact makes it possible to simplify the implementation of the method.

The subject of the invention is also an apparatus for detecting a point of contact between a tip of an instrument and a writing support in accordance with claim 10.

The embodiments of this apparatus can comprise the characteristic of claim 11.

The invention will be better understood on reading the description which follows, given solely by way of nonlimiting example, while referring to the drawings.

BRIEF DESCRIPTION OF THE DRAWINGS

FIG. 5 is an illustration of a histogram used in the method of FIG. 3;

FIG. 6 is a flowchart of a calibration phase liable to be used in the method of FIG. 3;

FIG. 7 is a schematic illustration of two different inclinations of the pen of the system of FIG. 1;

FIG. 8 is a schematic illustration of another embodiment of a pen of the system of FIG. 1;

In these figures, the same references are used to designate the same elements.

Hereinafter in this description, the characteristics and functions that are well known to the person skilled in the art are not described in detail.

The invention will now be described in the particular case where the instrument is a pen.

Figure 1:
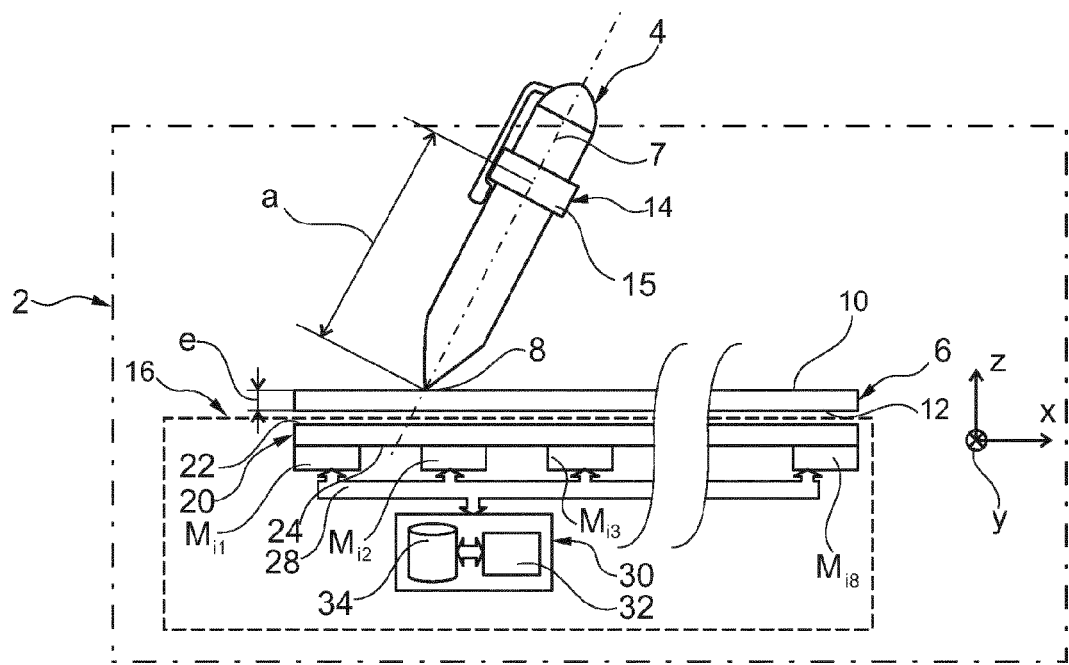
FIG. 1 is a schematic illustration of a system for logging the trace of the tip of a pen on a writing support.

FIG. 1 represents a system 2 for logging the trace of the tip of a pen 4 on a writing support 6.

The pen 4 is freely displaceable directly by the hand of a human being in a frame XYZ fixed without any degree of freedom to the system 2. Here, the directions X and Y of this frame are horizontal and the direction Z is vertical. Subsequently, the terms "above", "below", "upper", "lower" relate to this vertical direction Z.

The pen 4 typically weighs less than 1 kg and, preferably, less than 200 g or 100 g. The dimensions of this pen are also sufficiently small for it to be held with the aid of a single hand by a human being. The pen 4 exhibits an oblong shape. Here, it extends along a longitudinal axis 7.

For example, this pen 4 is made entirely of nonmagnetic materials, that is to say materials not exhibiting any magnetic property measurable by the system 2.

The pen 4 is here chosen in the group composed of a biro, of a fountain pen, of a quill pen, of a felt tip, of a pencil, of a marker, of a highlighter, of a reed pen, of a quill, of a brush. In this embodiment, by way of illustration, the pen 4 is a biro.

The pen 4 exhibits a tip 8 which deposits a colored liquid or solid on an upper face 10 of the writing support 6. For this purpose, for example, the pen 4 is provided with a colored liquid reservoir such as a cartridge. The colored liquid is for example ink. The tip 8 is situated on the axis 7 at the lower end of the pen 4. In this embodiment, the tip 8 exhibits symmetry of revolution about the axis 7. Thus, the angular position of the tip 8 about the axis 7 does not modify the width or the shape of the trace left by this tip 8 on the support 6.

For example, the support 6 is a conventional writing support exhibiting a non-zero thickness e in the direction Z. Here, the thickness e is assumed constant over the whole of the face 10. The thickness e may be arbitrary. In particular, this thickness e may be very small, that is to say less than 1 mm or than 0.5 mm in the case of a sheet of paper or a cloth. The thickness e may also be very large, that is to say greater than 5 mm in the case of a notebook or notepad.

The support 6 may be rigid or flexible. For example, a rigid support is a glass or metal plate. A flexible support is a sheet of paper.

The surface of the face 10 is sufficiently large to make it possible to write or to draw. For this purpose, it is typically greater than 6 or 20 or than 100 $cm^2$.

The support 6 also exhibits a lower face 12 on the opposite side to the face 10.

The system 2 comprises a magnetic object 14 and an apparatus 16 for locating the tip 8 in the XYZ frame on the basis of the measured position and of the measured orientation of the object 14. In FIG. 1, the vertical wavy lines indicate that a part of the apparatus 16 has not been represented.

The object 14 exhibits at least one measurable magnetic moment. Typically, it is made of ferromagnetic or ferrimagnetic material. Here, the object 14 is formed of a single permanent magnet 15. This magnet 15 exhibits a non-zero magnetic moment even in the absence of any exterior magnetic field. For example, the coercive magnetic field of this magnet 15 is greater than 100 $A·m^{-1}$ or 500 $A·m^{-1}$. The power of the magnet 15 is typically greater than 0.01 $A·m^2$ or 0.1 $A·m^2$.

Here the magnet 15 has the shape of an annulus whose diameter is larger than its height. The largest dimension of this magnet 15 is denoted L subsequently. Here it is the exterior diameter of the annulus.

The object 14 is fixed without any degree of freedom to the pen 4 in such a way that the magnetic moment of the magnet 15 coincides with the longitudinal axis 7. For this purpose, the axis of revolution of the annulus coincides with the axis 7. Here, the annulus surrounds the nonmagnetic material rigid body of the pen. In FIG. 1, the direction of the magnetic moment of the magnet 15 is represented by an arrow.

The shortest distance which separates the tip 8 from the orthogonal projection of the center of gravity of the object 14 on the axis 7 is here denoted "a".

The apparatus 16 comprises a tablet 20 exhibiting a bearing front face 22 and a rear face 24. This tablet is typically devoid of any electrical or electronic circuit. It is for example produced from a single block of material.

The face 22 extends horizontally. The lower face 12 of the support 6 is deposited directly on the face 22. The surface of the face 22 is sufficiently large to make it possible to write or to draw. Typically, it is greater than 20 or 100 $cm^2$.

The tablet 20 is made of a nonmagnetic rigid material. For example, the Young's modulus of the tablet 20 is greater than 2 or 10 or 50 GPa at 25° C. Moreover, its thickness is sufficient so as not to bend under the pressure exerted by the hand of the user when the latter is writing with the aid of the pen 4 on the support 6. For example, the tablet 20 is a glass plate whose thickness is greater than 1 mm or 4 mm.

The apparatus 16 comprises a network of N tri-axis magnetometers $M_{ij}$. This network makes it possible to locate the object 14 in the XYZ frame. Here, location is understood to mean the determination of the position x, y, z of the object 14 in the XYZ frame and also the determination of the orientation of the object 14 with respect to the directions X, Y and Z of the XYZ frame. For example, the orientation of the object 14 is represented by the angles $\theta_x$, $\theta_y$ and $\theta_z$ of the magnetic moment of the object 14, respectively, with respect to the axes X, Y and Z of the frame.

Typically, N is greater than five and, preferably, greater than sixteen or thirty-two. Here, N is greater than or equal to sixty-four.

In this embodiment, the magnetometers $M_{ij}$ are aligned in rows and columns to form a matrix. Here, this matrix comprises eight rows and eight columns. The indices i and j identify, respectively, the row and the column of this matrix at the intersection of which the magnetometer $M_{ij}$ is situated. In FIG. 1, only the magnetometers $M_{i1}$, $M_{i2}$, $M_{i3}$, $M_{i4}$ and $M_{i8}$ of a row i are visible. The position of the magnetometers $M_{ij}$ with respect to one another is described in greater detail with reference to FIG. 2.

Each magnetometer $M_{ij}$ is fixed without any degree of freedom to the other magnetometers. For this purpose, the magnetometers $M_{ij}$ are fixed without any degree of freedom on the rear face 24 of the tablet 20.

Each magnetometer $M_{ij}$ measures the direction and the intensity of the magnetic field generated by the object 14. Accordingly, each magnetometer $M_{ij}$ measures the norm of the orthogonal projection of the magnetic field generated by the object 14 at the level of this magnetometer $M_{ij}$ on three measurement axes of this magnetometer. Here, these three measurement axes are mutually orthogonal. For example, the measurement axes of each of the magnetometers $M_{ij}$ are, respectively, parallel to the directions X, Y and Z of the frame. The sensitivity of the magnetometer $M_{ij}$ is for example less than $10^{-6}$ T or $10^{-7}$ T.

Each magnetometer $M_{ij}$ is hooked up by way of a bus 28 for transmitting information to a processing unit 30.

The processing unit 30 is capable of determining the position of the tip 8 on the support 6 on the basis of the position and of the orientation of the object 14 in the XYZ frame, which are measured by the magnetometers $M_{ij}$. For this purpose, the unit 30 comprises a programmable electronic computer 32 able to execute instructions recorded on an information recording medium. The unit 30 therefore also comprises a memory 34 containing the instructions necessary for the execution by the computer 32 of the method of FIG. 3 or 6. In particular, the unit 30 implements a mathematical model associating each measurement of a magnetometer $M_{ij}$ with the position and with the orientation of the object 14 in the XYZ frame. This model is implemented in the form of an extended Kalman filter. This model is typically constructed on the basis of the physical equations of electromagnetism. To construct this model, the object 14 is approximated by a magnetic dipole. This approximation introduces only very few errors if the distance between the object 14 and the magnetometer $M_{ij}$ is greater than 2L and, preferably, greater than 3L, where L is the largest dimension of the object 14. Typically, L is less than 20 cm and, preferably, less than 10 or 5 cm.

The unit 30 is also capable of acquiring and recording the trace left by the tip 8 on the support 6 on the basis of the various positions determined for this tip.

Figure 2:
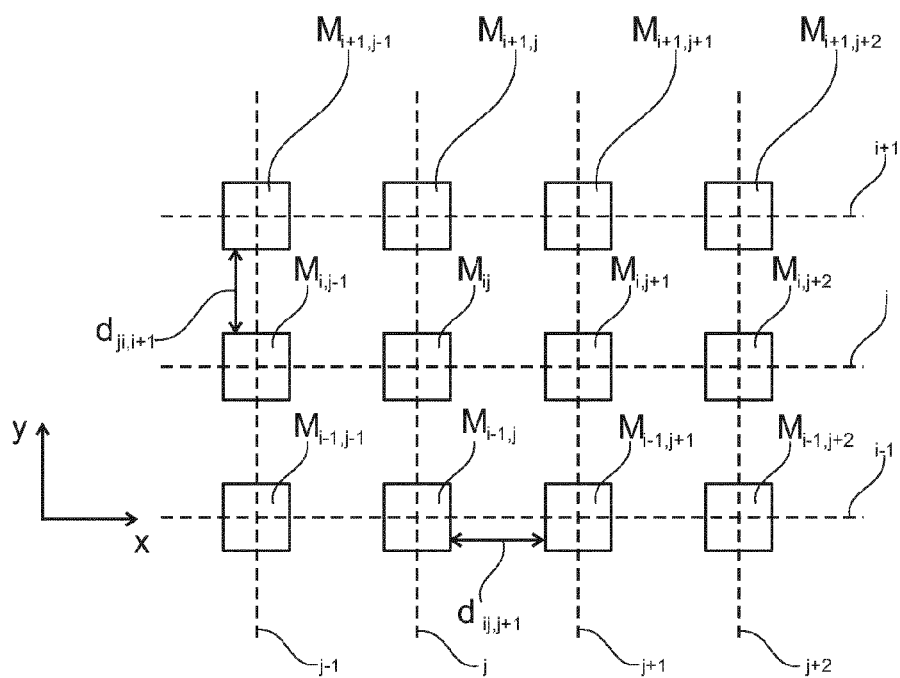
FIG. 2 is a schematic illustration of a part of a network of magnetometers used in the system of FIG. 1.

FIG. 2 represents part of the magnetometers $M_{ij}$ of the device 12. These magnetometers $M_{ij}$ are aligned in rows i parallel to the direction X. These magnetometers are also aligned in columns j parallel to the direction Y to form a matrix. The rows i and the columns j are disposed in the order of increasing indices.

The center of the magnetometer $M_{ij}$ is situated at the intersection of row i and of column j. The center of the magnetometer corresponds to the point where the magnetic field is measured by this magnetometer. Here, the indices i and j belong to the interval [1; 8].

The centers of two magnetometers $M_{ij}$ and $M_{i,j+1}$ immediately following one another along a row i are separated by a distance $d_{i,j;j+1}$. Similarly, the center of two magnetometers $M_{ij}$ and $M_{i+1,j}$ immediately following one another along one and the same column j are separated by a distance $d_{j,i;i+1}$.

Here, whatever the row i, the distance $d_{i,j;j+1}$ is the same. This distance is therefore denoted $d_j$. Similarly, whatever the column j, the distance $d_{j,i;i+1}$ between two magnetometers is the same. This distance is therefore denoted $d_i$.

In this particular embodiment, the distances $d_i$ and $d_j$ are both equal to d.

Typically, the distance d lies between 1 and 4 cm when:
the power of the permanent magnet is 0.5 A·m$^2$,
the sensitivity of the magnetometers is $4*10^{-7}$ T, and
the number of magnetometers $M_{ij}$ is sixty-four.

The operation of the system 2 will now be described with reference to the method of FIG. 3.

During a step 60, the apparatus 16 permanently measures the position and the orientation of the object 14 in the XYZ frame tied without any degree of freedom to the front face 22. To simplify, it is assumed here that the directions X and Y of this frame are contained in the plane of the front face 22. Consequently, the height, denoted $h_0$, of the object 14 with respect to the face 22 is equal to the value of the z coordinate of the object 14 in the XYZ frame.

In this first embodiment, it is assumed that the distance "a" which separates the tip 8 from the object 14 and that the thickness of the tablet 20 are known and prerecorded in the memory 34. For example, the distance "a" can be fixed by construction or measured by the user, and then transmitted to the processing unit 30. Consequently, the height $h_p$ of the tip 8 with respect to the face 22 is known each time that the position and the orientation of the object 14 are measured. The position of the tip 8 is equal to the position of the object 14, shifted by the distance "a" in the direction of the magnetic moment of the object 14. For example, the height $h_p$ is computed with the aid of the following relation: $h_p=h_0-a*\cos\theta$, where $\theta$ is the angle between the magnetic moment of the object 14 and the vertical direction Z. The angle $\theta$ and the value of the height $h_0$ are measured during step 60. The coordinates of the position of the tip 8 in the XYZ frame are here denoted $x_p$, $y_p$ and $z_p$. Here, the coordinate $z_p$ is equal to the height $h_p$.

In parallel, during a calibration phase 62, a contact threshold $S_{cp}$ is automatically configured. The threshold $S_{cp}$ makes it possible to detect contact of the tip 8 with the support 6. Indeed, it is considered that there exists a point of contact between the tip 8 and the support 6 if the height $h_p$ is less than or equal to the threshold $S_{cp}$. This threshold $S_{cp}$ is dependent on the thickness e of the support 6.

To automatically determine the value of this threshold $S_{cp}$, during a step 64, as long as the height $h_p$ is less than a threshold $S_{cpmax}$, the measurements of the height $h_p$ are recorded continuously over a sliding window of duration $\Delta T$. The value of the threshold $S_{cpmax}$ is predetermined. Typically, the value of this threshold $S_{cpmax}$ is sufficiently small for it to be probable that the user is in the process of writing when the height $h_p$ is less than this threshold. The value of the threshold $S_{cpmax}$ is also chosen sufficiently large to allow the computation of the value of the threshold $S_{cp}$ for a very large span of thickness e of the support 6. For example, the value of the threshold $S_{cpmax}$ is greater than 1 cm or 3 cm. It is also preferably less than 15 cm or 20 cm.

Preferably, each time that a measurement of the height $h_p$ is recorded, the computer 32 records at the same time, the value of the variance $v_p$ of the estimation error in this measurement of the height $h_p$. For example, this value of the variance $v_p$ is computed on the basis of the covariance matrix of the state estimated by the extended Kalman filter at this instant. Thus, a table, contained in the memory 34, associates the value of the variance $v_p$ with each measurement of the height $h_p$. The value of the variance $v_p$ associated with a measurement of the height $h_p$ is representative of the reliability of this measurement. Indeed, as a function of the position of the object 14 with respect to the magnetometers $M_{ij}$, the reliability in the measurement of the height $h_p$ varies. For example, the reliability in the measurement is lower if the object 14 is situated on an edge of the tablet 20.

The duration $\Delta T$ is such that the number of measurements recorded over this duration is greater than 100 or 1000. Moreover, the duration $\Delta T$ is sufficiently long to contain the values of the height $h_p$ that are measured during the writing of a complete word of at least five letters and, preferably, during the writing of a phrase of at least fifteen or twenty letters. For example, the duration $\Delta T$ is greater than or equal to 5 s or 10 s or 30 s. The duration $\Delta T$ is generally less than a minute.

Figure 4:
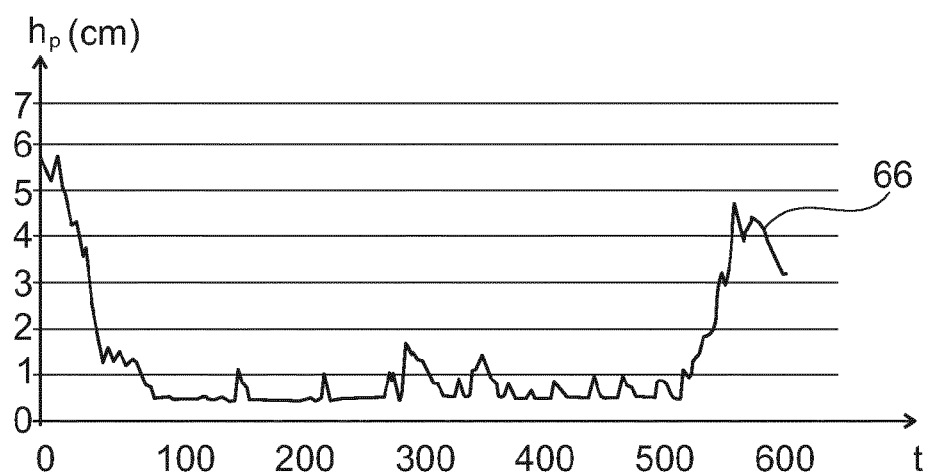
FIG. 4 is a graph illustrating the variation of the height of the tip of the pen in the system of FIG. 1.

FIG. 4 represents the measured values of the height $h_p$ that are recorded during step 64 while writing a phrase of several words. In this FIG. 4, the abscissa axis represents the time and the ordinate axis represents the height $h_p$ measured, expressed in cm.

The height $h_p$ increases when the user lifts the pen 4 to write a punctuation or to mark a space between two words or two strokes. On the other hand, when the tip 8 is in contact with the support 10, the height $h_p$ varies very little. This observation makes it possible to identify the height at which the tip 8 is in contact with the support 6 without it being necessary to know the thickness "e" of the support 6.

Thereafter, during a step 70, the value of the threshold $S_{cp}$ is determined automatically on the basis of the values recorded during step 64.

For example, for this purpose, during an operation 72, the unit 30 constructs a probability density D of the height $h_p$ on the basis of the recorded measurements. In, this example, the density D is a histogram 74 (FIG. 5). This histogram 74 comprises an abscissa axis divided into several spans $P_k$ of heights. These spans $P_k$ are contiguous and immediately successive. The index k identifies the span. Here, all the spans $P_k$ have the same width l. The width l depends on the accuracy that it is desired to obtain. For example, the accuracy required in the case of a biro which traces strokes whose width is less than 1 mm is not the same as that required for a marker, the thickness of whose strokes is greater than 5 mm. The width l is therefore determined experimentally. This width l is typically less than 1 mm and, preferably, less than 0.5 or 0.25 or 0.1 mm. For example, here, the width l is equal to 0.1 mm. It is generally greater than 0.005 mm.

To simplify FIG. 5, only five spans $P_1$ to $P_6$ are represented. These spans $P_1$ to $P_6$ correspond, respectively, to the intervals [0; 0.1], [0.1; 0.2], [0.2; 0.3], [0.3; 0.4], [0.4; 0.5], [0.5; 0.6].

The dashes on the abscissa axis indicate that only part of the histogram 74 has been represented in FIG. 5.

Each span $P_k$ is associated with a vertical bar $B_k$. In this example, the length of this bar $B_k$ along the ordinate axis represents the number $Nt_k$ of measurements recorded for the height $h_p$ whose value lies in the span $P_k$. Here, the length is directly proportional to the number $Nt_k$.

In FIG. 5, the length of the bars $B_1$ to $B_3$ is zero, so that they are not represented.

Thereafter, during an operation 76, the unit 30 identifies the first maximum, or first spike, in the histogram 74 which appears when scanning the abscissa axis in order of increasing height $h_p$. A maximum occurs in a span $P_k$ if the length of the bar $B_k$ is strictly greater than the length of the bar $B_{k-1}$ and of the bar $B_{k+1}$. Here, this maximum occurs in the span $P_5$. This span is denoted $P_{max}$ subsequently.

The first maximum makes it possible to identify the span $P_{max}$ in which the tip 8 is in contact with the support 6.

Thereafter, during an operation 78, the unit 32 chooses the value of the threshold $S_{cp}$ as a function of one or more values contained in the span $P_{max}$. For example, here, the value of the threshold $S_{cp}$ is chosen equal to the upper bound of the span $P_{max}+\epsilon$, where $\epsilon$ is an error margin. The error margin $\epsilon$ is determined experimentally. For example, $\epsilon$ is chosen here less than or equal to 1 mm or 0.5 mm or 0.1 mm or 0.05 mm or 0.0025 mm. Generally, the value of the threshold $S_{cp}$ thus chosen is less than 5 mm or 1 mm from the measurement of the height for which the probability density exhibits the first spike.

The use of the height $h_p$ and of the threshold $S_{cp}$ to detect the existence of a point of contact between the tip 8 and the support 6 is robust. Indeed, the threshold $S_{cp}$ does not depend on the inclination of the pen and therefore makes it possible to be more robust in relation to a change of user.

Here, the phase 62 is repeated in a loop so as to adapt dynamically and continuously to the modifications of the thickness e.

Once the threshold $S_{cp}$ has been configured, the unit 30 undertakes a phase 90 of logging the trace left by the pen 4 on the face 10 of the support 6.

Accordingly, during a step 92, the unit 30 computes the position of the tip 8 in the XYZ frame on the basis of the position and of the orientation of the object 14 as measured during step 60 and of the known distance "a". Moreover, the position of the tip at the moment at which the latter is in contact with the face 10 is equal to the position of the point of contact. For example, the position of the tip 8 is computed as described above.

During a step 94, the unit 30 detects the point of contact between the tip 8 and the face 10. Accordingly, the unit 30 compares the height $h_p$ with the threshold $S_{cp}$. A point of contact is detected solely when the height $h_p$ is less than the threshold $S_{cp}$.

Thereafter, each time that a point of contact is detected, during a step 96, the unit 30 logs the coordinates $x_p$ and $y_p$ at the moment at which this point of contact occurs.

Thereafter, during a step 98, the unit 30 records, for example in the memory 34, the computed position for the tip 8 when the latter is in contact with the support 6.

Steps 92 to 98 are repeated in a loop.

The successive recording of the position of the tip 8 on the face 10 constitutes the log of the trace left by the tip 8 on this support 6. For example, here, each position of the tip 8 when it is in contact with the support 6 is recorded in chronological order. Conversely, the positions of the tip 8 when the latter is not in contact with the support 6 are recorded as not forming part of the trace left on the support 6.

Figure 3:
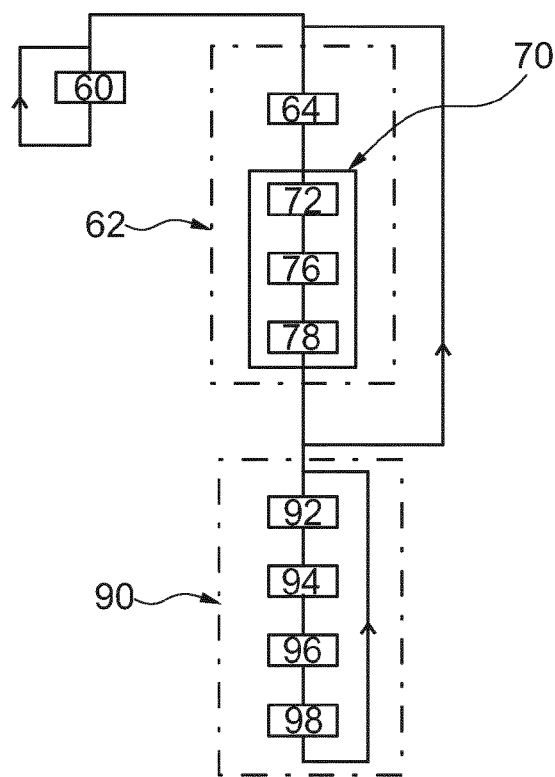
FIG. 3 is a flowchart of a method of logging the trace of the tip of a pen on a writing support with the aid of the system of FIG. 1.

FIG. 6 represents another embodiment of the method of FIG. 3. This other embodiment is identical to the method of FIG. 3 except that the phase 62 is replaced with a calibration phase 110. To simplify FIG. 6, only the phase 110 has been represented.

Initially, during a step 112, the user maintains the tip 8 of the pen 4 in contact with the face 10 and then displaces the opposite end of the pen 4 to modify its inclination with respect to the support 6 without modifying the position of the tip 8 on this support 6. FIG. 7 represents two positions of the biro 4 obtained during step 112. In this figure, the axis 7 corresponds to a first inclination while the axis 7a corresponds to a second inclination of the biro 4. To simplify FIG. 7, only the axis 7a has been represented for the second inclination.

In parallel, during a step 114, the computer 32 logs the position and the orientation of the object 14, measured on the basis of the network of magnetometers. Thus, the computer 14 logs a fan of orientations which all point toward the point of contact between the tip 8 and the face 10 of the support 6. In FIG. 7, this point of contact bears the reference It.

Hereinafter in this description, the computation of the value of the threshold $S_{cp}$ and of the distance "a" is illustrated in the case of the first and second inclinations represented in FIG. 7. However, what is described hereinbelow can readily be generalized to the case of more than two inclinations of the pen 4.

During a step 116, the unit 30 computes the point of intersection It between the axes 7 and 7a. Preferably, accordingly, the unit 30 computes the coordinates of the point of the XYZ frame which minimize the distance between the axes 7 and 7a. The height of the point of intersection It with respect to the face 22 makes it possible to obtain an estimation of the thickness e of the support 6 since here the thickness of the tablet 20 is assumed known.

Thereafter, during a step 118, the value of the threshold $S_{cp}$ is computed on the basis of this estimation of the thickness e. For example, the value of the threshold $S_{cp}$ is chosen equal to this estimation plus an error margin. The error margin is for example the same as that used during the operation 78.

Finally, during a step 120, the distance "a" is computed. For example, the unit 30 computes the distance "a" as a function of the position and of the orientation that were logged during step 114. Indeed, since the tip 8 is in contact with the face 10, the distance "a" corresponds to the distance which separates the object 14 from the face 10 in the direction of its magnetic moment. For example, the distance "a" is computed with the aid of the following relation: $h_0 = a*\cos\theta + e$, where:
- $h_0$ is the height of the object 14 with respect to the face 22;
- $\theta$ is the angle between the magnetic moment of the object 14 and the vertical direction Z, and
- "e" is the estimation, obtained during step 116, of the thickness of the support 6.

The angle $\theta$ and the value of the height $h_0$ are deduced from the logs produced during step 114. Once the distance "a" has been computed, it is said to be "known".

FIG. 8 represents another embodiment of the system. In this embodiment, the pen 4 is replaced with a pen 130. The pen 130 is identical to the pen 4 with the exception of the fact that it comprises a tip 132 and a magnetic object 134.

In contradistinction to the tip 8, the tip 132 does not exhibit any symmetry of revolution about the axis 7. Consequently, the trace left by this tip 132 on the support 6 depends on its angular position about the axis 7. For example, the tip 132 is the tip of a reed pen.

The magnetic object 134 makes it possible to determine the angular position of the tip 132 about the axis 7. Accordingly, the object 134 is identical to the object 14 except that it comprises an additional permanent magnet 136. The magnetic moment of the magnet 136 is non-collinear with the magnetic moment the magnet 15. For example, preferably, they are mutually orthogonal.

The unit 30 is adapted for measuring the position and the orientation of the object 134. For example, if necessary, the object 134 is modeled by approximating each magnet 15, 136 by a magnetic dipole in the model used to construct the extended Kalman filter. The operating method of this system is deduced from that described with reference to FIG. 3 or 6 except that the orientation of the tip 132 in the XYZ frame is also recorded so as to constitute the log of the trace left by this point on the support 6.

Figure 9:
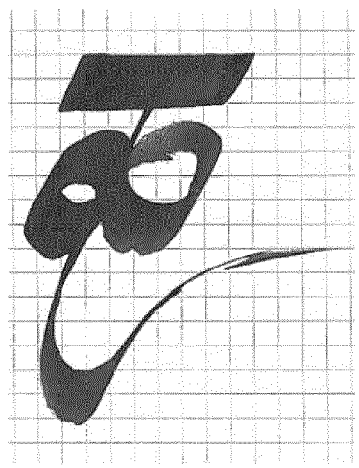
FIGS. 9 and 10 are illustrations, respectively, of experimental results of a logging of a trace with the aid of the system of FIG. 1.
Figure 10:

FIGS. 9 and 10 represent, respectively, the trace produced with the pen 130 on the writing support 6 and the trace logged with the aid of the system during experimentation of this system.

Numerous other embodiments are possible. For example, the writing support may be cardboard or fabric.

In another embodiment, the writing support consists of the tablet 20. In this case, if colored liquid is deposited by the pen, it is deposited directly on the face 22 of the tablet 20. For example, in this case, the tablet 22 is a picture, a wall or a window.

If the surface of the network of magnetometers is sufficiently extensive, the system 2 can simultaneously comprise several magnetic objects 15. In this case, the method described hereinabove is applied, in parallel, for each of these magnetic objects. This makes it possible for example to log the trace of several users writing simultaneously on the same support.

Other algorithm for determining the position and/or the orientation of the object 15 are possible. For example, the procedure described in U.S. Pat. No. 6,269,324 is usable. These procedures do not necessarily use a Kalman filter. For example, the procedures described in US2002/171427A1 or U.S. Pat. No. 6,263,230B1 are possible.

As a variant, the measurements of the magnetometers are firstly used to construct a magnetic imprint of the object 15. A magnetic imprint is also known by the term "magnetic signature". It consists of one or more characteristics specific to the object 15 and making it possible to distinguish it from other magnetic objects. These characteristics are obtained on the basis of the measurements of the magnetometers. The imprint constructed is thereafter compared with a database of predetermined magnetic imprints of known objects. This database associates with each known object complementary information such as, for example, the value of its magnetic moment, the distance "a" or the like. If the imprint constructed corresponds to one of those of the database, the complementary information associated with this known object is then used to improve or simplify the location of this object. Thus, in an advantageous embodiment, the imprint of the magnetic object is the value of its magnetic moment and the database associates a value of the distance "a" with each value of a magnetic moment. Henceforth in this embodiment, it is the value of the magnetic moment of the permanent magnet which codes the value of the distance "a".

The approximation used to construct the Kalman filter can also be a quaternary or higher approximation, that is to say the equations of electromagnetism are approximated to a higher order than that corresponding to the dipolar approximation.

The magnetometers of the network of magnetometers are not necessarily arrayed in columns and rows. They can be also arranged according to other patterns. For example, the magnetometers are disposed on each vertex of each triangular or hexagonal mesh cell of a mesh of a plane.

The disposition of the magnetometers with respect to one another can also be random or non-regular. Thus, the distance between two immediately consecutive magnetometers in the network is not necessarily the same for all the pairs of two immediately consecutive magnetometers. For example, the density of magnetometers in a given zone of the network may be greater than elsewhere. Increasing the density in a given zone can make it possible to increase the accuracy of the measurement in this zone. It is also possible to envisage zones of greater density on the periphery of the network so as to limit the edge effects. For example, the network of magnetometers can comprise a central zone devoid of any magnetometer. In this case, the magnetometers are distributed solely on the periphery of this central zone and form a band of magnetometers which surrounds and delimits the central zone. Typically, the width of this band is strictly less than the width of the central zone measured in the same direction.

The automatic determination of the value of the threshold $S_{cp}$ as a function of the first maximum of the histogram 74 can be carried out differently. For example, the value of the span $P_{max}$ adopted to compute the value of the threshold $S_{cp}$ can be the median value of the span $P_{max}$. Other possibilities exist for computing the value of the threshold $S_{cp}$ on the basis of the span $P_{max}$. For example, it is possible to perform an average of the various height measurements contained in the span $P_{max}$. In this average, each height measurement can be weighted by a weight representative of the reliability of the measurement of this height. For example, this weight is equal to the inverse of the variance $v_p$ of the estimation error which is associated with this height in the table recorded in the memory 34. To compute this average, it is also possible to take into account the height measurements contained in the spans $P_k$ adjacent to the span $P_{max}$. Thereafter, the error margin E can be added to the computed average.

In another embodiment, the first maximum is identified as being the maximum of the probability density having the smallest width at mid-height. Indeed, only contact between the tip and the writing support is capable of sufficiently reducing the amplitude of the variations of the height $h_p$.

In another variant, the length of each bar $B_k$ of the histogram is not solely dependent on the number of measurements $Nt_k$ but, in addition, is dependent on a weight representative of the reliability of the measurement. For this purpose, the length of each bar $B_k$ is for example also dependent on the variance $v_p$ associated with each height measurement contained in the span $P_k$. For example, each time that a height measurement is contained in the span $P_k$, the unit 30 increases the length of the bar $B_k$ by a value equal to the inverse of the variance $v_p$ associated with this measurement of the height $h_p$. This makes it possible to take into account the accuracy in the measurement, thereby increasing the accuracy with which the contact threshold is determined.

The operation 72 for constructing the probability density D of the height $h_p$ can also be carried out by taking account of a weight representative of the reliability of each measurement. For example, the unit 30 associates, with each measurement $h_{pi}$ of the height $h_p$, a distribution $P(h_k)$ of probability that the vertical position is equal to $h_k$, where the index i is an identifier of the serial number of the measurement. For example, if the probability distribution is assumed Gausian, one associates with each measurement $h_{pi}$ the probability density defined by the following relation:
$P(h_k)=(1/(2\pi\tau_i^2)^{1/2}\exp[-(h_k-\mu_i)^2/2\tau_i^2]$; where:

$P(h_k)$ is the probability that the height $h_p$ is equal to $h_k$, $\sigma_i$ is the standard deviation, "exp" is the exponential mathematical operation, and $\mu_i$ is the expectation.

The expectation $\mu_i$ is chosen equal to the measurement $h_{pi}$. The standard deviation $\sigma_i$ can be computed on the basis of the value of the variance $v_i$ associated with the measurement $h_{pi}$. This probability density $P(h_k)$ is centered on the measurement $h_{pi}$ of the height $h_p$. The unit 30 then obtains the probability density D of the height $h_p$ by summing each of the densities $P(h_k)$ obtained on the basis of the various measurements of the height $h_p$ over time. Thereafter, it is this density D obtained by summation which is used during the operation 76. In this procedure, a measurement is therefore represented by a probability density $P(h_k)$ whose standard deviation is dependent on the variance $v_p$. The effect of this addition of information into the density D is to enhance the reliability of the determination of the threshold $S_{cp}$.

The value of the threshold $S_{cp}$ can also be configured automatically by methods other than those involving the construction of a histogram of the recorded measurements. However, even in this case, the value thus constructed depends on the first maximum of the probability density of the height $h_p$. For example, another possibility for determining the threshold $S_{cp}$ consists in searching only for the minimum over a sample of measurements of $h_p$ during a sliding window. Preferably, an error margin is added to this minimum. The error margin is for example less than 2 cm and, preferably, less than 5 mm, 1 mm or 0.5 mm or indeed 0.1 mm. This margin depends on the writing device used. It is possible to take a large margin for a felt tip and a lower margin for a biro. Thus the measurements below this threshold correspond to a detection of a point of contact. The number of samples or of measurements contained in the sliding window must be sufficiently large and greater than the duration between two successive points of contact. For example, the duration of the sliding window is at least 5 s and, preferably, greater than 10 s, 30 s or 1 min. This can even be done for a sliding window whose duration corresponding to the whole set of measurements carried out. Another possibility for determining the minimum over the sliding window, consists in averaging the F lowest measurements of height carried out during the sliding window. Preferably, this number F is chosen as a function of the number of measurements contained inside the sliding window. For example, the number F is a fraction of the number of measurements contained in the sliding window. For example, this fraction lies between 1/1000 and 1/10. By way of illustration, F is greater than two, ten or fifty. The latter procedure for determining the threshold $S_{cp}$ is less sensitive to noise.

Moreover, if it is considered that the inclination of the pen 4 with respect to the face 22 is always constant, then the point of contact can be determined using the measurements of the height $h_0$ in place of the measurements of the height $h_p$. In this variant, it is not necessary to know the distance "a".

The phase of configuring the threshold $S_{cp}$ might not be carried out in an automatic manner. For example, the value of the threshold $S_{cp}$ may be chosen by the user instead of being configured automatically as described previously. The value of the threshold $S_{cp}$ can also be fixed by default and prerecorded. This is possible when the thickness of the support 6 is always the same or is negligible. For example, in the case where one writes directly on the face 22 of the tablet 20, the threshold $S_{cp}$ is prerecorded and it is not necessary to undertake a phase of automatic configuration of this threshold.

The phases 62 and 110 do not need to be executed simultaneously with the measurement of the position and orientation of the object 14 or 134 carried out during step 60. On the contrary, these phases can also be executed after step 60 on data recorded during step 60.

Step 96 can be carried out differently. For example, the coordinates recorded, in place of the coordinates $x_p$, $y_p$, are the coordinates $x_i$, $y_i$ corresponding to the intersection between the straight line generated on the basis of the position and orientation of the object with the face 10 of the support 6. Another procedure during step 96 consists in recording, in place of the coordinates $x_p$, $y_p$, the coordinates $x_h$, $y_h$, corresponding the intersection between the straight line generated on the basis of the position and orientation of the object with a plane parallel to the face 22 but shifted upwards by the value of the threshold $S_{cp}$. It is also possible to record, in place of the coordinates $x_p$, $y_p$, during step 96, coordinates x, y corresponding to a weighting of the three coordinates $x_p$, $y_p$, $x_i$, $y_i$ and $x_h$, $y_h$. For example it is possible to use the average of $x_i$, $y_i$ and $x_h$, $y_h$.

As a variant, the bearing face 22 is not necessarily plane. For example, it may be round or spherical.

In another embodiment, the pen does not deposit colored liquid or solid on the writing support. For example, the pen is a stylus. However, even in this embodiment, the system 2 makes it possible to detect a point of contact between the tip of the stylus and the writing support and to log the trace drawn with the aid of the stylus. Preferably, in this case, the system 2 is equipped with a man-machine interface making it possible to represent, ideally in real time, for example on a screen, the trace logged as and when the latter is logged. For example, in this case, the tablet 20 is a screen on which the the logged trace is displayed in real time.

The automatic configuration of the threshold $S_{cp}$ such as described with reference to phase 62, can be implemented whatever sensors are used to measure the height $h_p$. Thus, this phase 62 can be implemented using sensors other than magnetometers. For example, as a variant, the height $h_p$ is measured with the aid of a camera and of a shape recognition algorithm able to determine this height with respect to the face 22. In this case, the pen does not need to be provided with a magnetic object.

Everything stated above in the particular case of a pen also applies to the case of the logging of the trace of an eraser on the writing support. The eraser may be a rubber or may act by depositing a chemical product. Like the pen, the eraser may also be a simple stylus. In the latter case, the stylus makes it possible solely to erase portions of the trace logged by the system 2 without having any action on the colored liquid or solid deposited physically on the writing support. In contradistinction to the pen, contact between the tip of the eraser and the writing support triggers the erasure, in the memory 34, of the positions logged for the pen which are the same as those logged for the tip of the eraser. In another embodiment, contact between the tip of the eraser and the writing support triggers the erasure, in the memory 34, of the positions logged for the pen which are contained inside a zone of predefined dimension attached to each position logged for the tip of the eraser. Typically, the zone of predefined dimension corresponds to the dimensions of the eraser. This eraser can be used to erase a pen trace logged with the aid of the system 2 or with the aid of another, for example conventional, system.

Phases 62 and 110 can be implemented independently of one another as described previously or, on the contrary, be executed successively during one and the same calibration phase.

The invention claimed is:

1. An apparatus for detecting a point of contact between a tip of an instrument and a writing support, the instrument being one of a pen and an eraser, the apparatus comprising:
 a network of magnetometers able to measure the height of a magnetic object fixed without any degree of freedom on the instrument with respect to a bearing face of a tablet, the bearing face constituting the writing support or supporting the writing support,
 a computer programmed to:
  determine the height of a point of the instrument with respect to the bearing face of the tablet on the basis of the measurements of the network of magnetometers at a plurality of locations as the instrument is moved with respect to the writing support,
  compare the height determined for each of the plurality of locations with a preconfigured contact threshold, and
  detect a point of contact between the tip of the instrument and the writing support if the height determined is less than the preconfigured contact threshold and, in the converse case, not detect a point of contact between the tip of the instrument and the writing support
  wherein the preconfigured contact threshold is configured to be a function of at least some of the determined heights of the point of the instrument with respect to the writing support at the plurality of locations.

2. The apparatus as claimed in claim 1, in which the network of magnetometers is a network of tri-axis magnetometers fixed without any degree of freedom to the bearing face and distributed along at least two non-collinear axes parallel to the bearing face, the network comprising n tri-axis magnetometers linked to one another without any degree of freedom so as to preserve a known distance between each of these magnetometers, where n is an integer number greater than or equal to five.

3. A method of detecting points of contact between a tip of an instrument and a writing support as the instrument is moved with respect to the writing support, the instrument being one of a pen and an eraser, the method comprising:
 determining, with the aid of a magnetic object fixed without any degree of freedom on the instrument, the height of a point of the instrument with respect to the writing support at a plurality of locations as the instrument is moved with respect to the writing support,
 comparing the height determined for each of the plurality of locations with a preconfigured contact threshold, and
 detecting points of contact between the tip of the instrument and the writing support if the height for each said point is determined to be less than the preconfigured contact threshold and, in the converse case, detecting no points of contact between the tip of the instrument and the writing support;
 wherein the preconfigured contact threshold is configured to be a function of at least some of the determined heights of the point of the instrument with respect to the writing support at the plurality of locations.

4. The method as claimed in claim 3, further comprising a step of automatically configuring the contact threshold, the step comprising:
 recording all of the measurements of the height of the point of the instrument carried out over a time interval during which the instrument is used to write on the writing support, and
 choosing the value of the contact threshold as a function of the height measurements recorded.

5. The method as claimed in claim 4, in which
 the step of recording also comprises recording a weight associated with each recorded measurement of the height, the weight representing the reliability of the recorded measurement of the height, and choosing the value of the contact threshold carried out as a function of the height measurements recorded and of the weight recorded for each of these measurements.

6. The method as claimed in claim 4, in which the step of automatically configuring the value of the contact threshold comprises:
constructing a probability density of the height of the point of the instrument on the basis of the recorded measurements, and
choosing the value of the contact threshold equal, to within plus or minus 1 mm, to the height for which the probability density constructed exhibits a first maximum, the first maximum being the first maximum encountered when scanning an abscissa axis of the probability density in order of increasing height.

7. The method as claimed in claim 6, in which the step of constructing the probability density comprises constructing a histogram of the recorded measurements comprising:
An abscissa axis cut up into several contiguous spans of heights, the width of each span being less than or equal to 5 mm, and
A bar associated with each span, the length of the bar parallel to an ordinate axis being dependent on the number of recorded measurements of the height whose value is contained in the span of heights which is associated with this bar.

8. The method as claimed in claim 3, in which the step of determining the height of a point of the instrument comprises determining the height of the tip of the instrument with respect to the bearing face, and the step of determining further comprises:
A) measuring the position and the orientation of the magnetic object fixed without any degree of freedom on the instrument in a known position with respect to the tip of the instrument, and
B) computing the height of the tip with respect to the bearing face on the basis of the measured position and of the measured orientation of the magnetic object and of the known position of the magnetic object with respect to the tip of the instrument.

9. The method as claimed in claim 3, in which the method comprises a step of automatically calibrating the position of the magnetic object with respect to the tip, the magnetic object being fixed on the instrument in such a way that the orientation of the magnetic moment of the magnetic object identifies in a unique manner an axis passing through the tip, the method comprising:
when a point of contact exists between the tip of the instrument and the writing support, logging the measured position and the measured orientation of the magnetic object, and
computing the position of the tip with respect to the magnetic object as a function of the position and of the orientation of this magnetic object, measured when the tip is in contact with the writing support.

10. A method of detecting a point of contact between a tip of an instrument and a writing support, the instrument being one of a pen and an eraser, the method comprising determining, with the aid of a magnetic object fixed without any degree of freedom on the instrument, the height of a point of the instrument with respect to a bearing face of a tablet, the bearing face constituting the writing support or supporting the writing support, wherein the method further comprising:
comparing the height determined with a preconfigured contact threshold, and
detecting a point of contact between the tip of the instrument and the writing support if the height determined is less than the contact threshold and, in the converse case, detecting no point of contact between the tip of the instrument and the writing support;
wherein the step of determining the height of a point of the instrument comprises determining the height of the tip of the instrument with respect to the bearing face, and the step of determining further comprises:
A) measuring the position and the orientation of the magnetic object fixed without any degree of freedom on the instrument in a known position with respect to the tip of the instrument, and
B) computing the height of the tip with respect to the bearing face on the basis of the measured position and of the measured orientation of the magnetic object and of the known position of the magnetic object with respect to the tip of the instrument; and
wherein the method further includes:
during step A), measuring the magnetic moment of the magnetic object,
selecting in a database a prerecorded magnetic moment corresponding to the magnetic moment measured during step A), the database associating with each prerecorded magnetic moment an item of information coding a particular position of a magnetic object with respect to the tip of the instrument, and
during step B), using, in the guise of known position of the magnetic object with respect to the tip of the instrument, of the position coded by the item of information associated with the prerecorded magnetic moment selected from the database.

11. A method of logging the trace drawn by a tip of an instrument on a writing support, the instrument being one of a pen and an eraser, the method comprising:
measuring the position and the orientation of a magnetic object fixed without any degree of freedom on the instrument,
computing the position of the tip as a function of the measured position and of the measured orientation of the magnetic object,
detecting a point of contact between the tip of the instrument and the writing support,
each time that a point of contact is detected, recording the computed position for the tip, the successive recording of these computed positions forming the log of the trace drawn by the tip of the instrument on the writing support;
wherein the step of detecting a point of contact includes:
determining, with the aid of a magnetic object fixed without any degree of freedom on the instrument, the height of a point of the instrument with respect to a bearing face of a tablet, the bearing face constituting the writing support or supporting the writing support;
comparing the height determined with a preconfigured contact threshold, and
detecting a point of contact between the tip of the instrument and the writing support if the height determined is less than the contact threshold and, in the converse case, detecting no point of contact between the tip of the instrument and the writing support; and
wherein the magnetic object used to detect the point of contact is the same as that used to determine the position of the tip on the writing support.

* * * * *